(12) United States Patent
Coombs et al.

(10) Patent No.: US 7,441,809 B1
(45) Date of Patent: Oct. 28, 2008

(54) MODULAR MINE SERVICE VEHICLE

(75) Inventors: Perry L. Coombs, Claremont, NH (US); Travis E. Congdon, Charlestown, NH (US)

(73) Assignee: Oldenburg Group Incorporated, Glendale, WI (US)

( * ) Notice: Subject to any disclaimer, the term of this patent is extended or adjusted under 35 U.S.C. 154(b) by 492 days.

(21) Appl. No.: 11/224,733

(22) Filed: Sep. 12, 2005

Related U.S. Application Data (60) Provisional application No. 60/609,392, filed on Sep. 13, 2004.

(51) Int. Cl.
*B62D 21/12* (2006.01)
(52) U.S. Cl. .................. 280/785; 280/781; 280/124.11
(58) Field of Classification Search ................ 280/781, 280/785, 788, 124.1, 124.11, 124.116; 180/311; 296/193.03, 193.04
See application file for complete search history.

(56) References Cited

U.S. PATENT DOCUMENTS

| | | | |
|---|---|---|---|
| 1,554,167 A | | 9/1925 | Remde |
| 2,109,311 A | * | 2/1938 | Dayton ........................ 280/788 |
| 2,218,634 A | * | 10/1940 | Best ............................ 267/249 |
| 2,361,323 A | * | 10/1944 | Seghers ....................... 280/686 |
| 2,499,495 A | * | 3/1950 | Gregory ...................... 280/788 |
| 2,641,482 A | * | 6/1953 | Wilfert ................. 280/124.116 |
| 3,332,701 A | | 7/1967 | Masser |
| 3,533,642 A | | 10/1970 | Cederlund |
| 3,630,541 A | * | 12/1971 | Carlson et al. ........ 280/124.116 |
| 4,165,098 A | | 8/1979 | Wagner |
| 4,165,099 A | | 8/1979 | Wagner et al. |
| RE30,308 E | | 6/1980 | Masser |
| 4,422,685 A | * | 12/1983 | Bonfilio et al. ........ 296/193.04 |
| 4,676,545 A | * | 6/1987 | Bonfilio et al. ........ 296/193.04 |
| 4,881,756 A | * | 11/1989 | Kumasaka et al. ........... 280/785 |
| 4,887,859 A | * | 12/1989 | Aper ........................ 296/26.08 |
| 4,932,795 A | * | 6/1990 | Guinn ......................... 384/276 |
| 5,118,131 A | | 6/1992 | Manning |
| 5,219,232 A | * | 6/1993 | Adams et al. ................ 384/275 |
| 5,401,056 A | * | 3/1995 | Eastman ...................... 280/785 |
| 5,639,110 A | * | 6/1997 | Pierce et al. ........... 280/124.116 |
| 5,702,121 A | * | 12/1997 | Song ..................... 280/124.152 |
| 5,720,489 A | | 2/1998 | Pierce et al. |
| 5,951,032 A | | 9/1999 | Overby et al. |
| 6,089,343 A | * | 7/2000 | Brewer ........................ 180/311 |
| 6,099,039 A | * | 8/2000 | Hine ............................ 280/781 |
| 6,120,059 A | * | 9/2000 | Beckman ..................... 280/785 |

(Continued)

*Primary Examiner*—Kevin Hurley
*Assistant Examiner*—Barry Gooden, Jr.
(74) *Attorney, Agent, or Firm*—Michael J. Weins; Jeffrey E. Semprebon (57) ABSTRACT

A mine service vehicle has a forward module, a rear module, and a cab module of unitized construction that can be secured together to assemble the vehicle. The forward and rear modules preferably have frame sections with terminating plates that can be affixed together with bolts, while the cab preferably mounts to the forward and rear modules by resilient couplings. The bolts preferably pass through tension sleeves into threaded holes in bolt receiver plates attached to one of the terminating plates. A frame extender can be affixed between the terminating plates to lengthen the vehicle. The vehicle preferably has a rear axle mounted to axle support bars that are each resiliently, floatably mounted to a pair of axle support brackets by a pivot bolt, with resilient bearings interposed between the axle support bar and the pivot bolt as well as between the pivot bolt and the axle support brackets.

11 Claims, 9 Drawing Sheets

U.S. PATENT DOCUMENTS

| | | | |
|---|---|---|---|
| 6,138,786 A * | 10/2000 | Anderson et al. | 180/312 |
| 6,199,894 B1 | 3/2001 | Anderson | |
| 6,311,995 B1 * | 11/2001 | Anderson | 280/124.11 |
| 6,460,872 B2 * | 10/2002 | Cadden | 280/678 |
| 6,508,462 B2 * | 1/2003 | Eshelman | 267/220 |
| 6,550,795 B1 | 4/2003 | Schlosser et al. | |
| 6,561,718 B1 * | 5/2003 | Archer et al. | 403/155 |
| 6,698,932 B2 * | 3/2004 | Hamaguchi et al. | 384/275 |
| 7,252,168 B2 * | 8/2007 | Lin et al. | 180/208 |
| 7,287,779 B2 * | 10/2007 | Miller | 280/781 |
| 2002/0081046 A1 * | 6/2002 | Hamaguchi et al. | 384/276 |
| 2003/0020251 A1 | 1/2003 | Gregg et al. | |
| 2004/0173983 A1 * | 9/2004 | Cheng | 280/124.1 |
| 2004/0238298 A1 * | 12/2004 | Nash | 188/152 |
| 2005/0046167 A1 * | 3/2005 | Lin | 280/785 |
| 2006/0033298 A1 * | 2/2006 | Longworth et al. | 280/124.11 |
| 2006/0103126 A1 * | 5/2006 | Miller | 280/781 |
| 2006/0159376 A1 * | 7/2006 | Takayama et al. | 384/276 |

* cited by examiner

MODULAR MINE SERVICE VEHICLE

This application claims priority of U.S. Application No. 60/609,392 filed Sep. 13, 2004.

FIELD OF INVENTION

The present invention relates to a multipurpose mine service vehicle and more particularly to a modular vehicle that can be configured to provide alternative services.

BACKGROUND OF THE INVENTION

Vehicles are frequently employed in underground environments such as mines for transporting personnel and equipment, or to serve as a mobile platform for relatively light equipment, such as a lift to allow personnel to string electrical cables or otherwise work in an elevated position. Because these underground environments feature uneven terrain and rough rock walls, such vehicles are typically subject to severe wear and susceptibility to damage. This is especially true of vehicle bodies, which are classically formed of much thinner material than that which makes up the rigid frame of the vehicle; such bodies are easily damaged by impact with rock surfaces. To counter this, it is desirable for such vehicles to be built with a more rigid and durable structure than conventional vehicles intended for road travel, and to have a suspension system which can withstand the rigors of heavy use on uneven surfaces.

One early patent addressing the issue of durability for a vehicle is U.S. Pat. No. 1,554,167, which teaches a truck frame assembled from components including two U-shaped channel side pieces which are taught as providing buffing surfaces to allow the vehicle to be used in narrow spaces.

More recently, vehicles have been made with a structure where the frame of the vehicle is unitized with the body and the body is fabricated from metal plate stock. While such vehicles have been found to have the desired durability when operated in underground environments, the unitized structure may be too large to pass through sections of the mine where the path is constricted, in particular the entrance passage, which is frequently limited in size. In some cases, this has required a vehicle to be cut into sections to pass through these constrictions so as to be introduced into the work site in the mine, and the sections then welded back together. This process would need to be repeated to move the vehicle to a new work site.

Another concern with the use of unitized construction for a mine vehicle is that it limits the ability to readily configure the vehicle for different purposes. Because mine vehicles may be needed for various uses, it is desirable to employ a design which can be readily adapted to various configurations. For over-the-road vehicles, this problem has been partially addressed in the trucking industry by providing telescoping frames and repositionable wheels, such as taught respectively in U.S. Pat. Nos. 6,199,894 and 5,720,489. However, such structures result in reduced strength when expanded and/or result in larger subassemblies when disassembled. Also, such a solution does not readily lend itself to interchangeability of parts, which could simplify fabrication of different vehicles by allowing the use of more standardized parts; the use of interchangeable parts might also allow a particular vehicle to be reconfigured for a different use as the needs of the user change.

Another problem in underground environments can be the unevenness of the terrain over which the vehicle is operated. One approach to effectively deal with the changes in the inclination of the mine floor and manipulating the vehicle in a mine environment is to provide a durable and forgiving suspension system. For trailers used in the transporting industry, one durable type of suspension which has been employed in over-the-road vehicles has been to use a "trunnion axle suspension", which employs trailing arms to which an axle is mounted, each of the arms being pivotably connected by an axle to the vehicle frame at a point ahead of the axle. In some cases this can be done by employing an elastomer bearing at the point of articulation to accommodate very limited movement and reduce wear. One or more shock-absorbing elements are connected between each of the arms and the frame, either ahead of or to the rear of the axle; the trunnion axle suspension is particularly well suited for use with an air spring as a shock-absorbing element. Typical examples of such suspensions are illustrated in U.S. Pat. Nos. RE 30,308; 3,332,701; and 6,550,795; and in U.S. Publication No. 2003/0020251. These mechanisms generally have fixed pivot shafts about which the trailing arms rotate. These pivot shafts are either fixed to the frame to which the arm is mounted or, alternatively, are formed as part of the trailing arm. In either case, these structures provide minimal transverse motion of the arm; this limited motion may be adequate for many road conditions, but will not serve well when traversing more challenging surfaces, since these devices essentially limit the motion of the trailing arm on which the axle is mounted to motion in a plane to which the axis of the pivot shaft is perpendicular.

Thus, there is a need for a vehicle structure which is sturdy yet which can be readily disassembled into smaller components and which can be readily configured for various uses. There is also a need for a vehicle suspension system which is durable and well suited for use supporting a driven axle when the vehicle is operated on uneven terrain.

SUMMARY OF THE INVENTION

The present invention is for an improved mine service vehicle which has several features that make it well suited for operation in the underground environments of mines. The vehicle is constructed from modular units which can be readily assembled on-site, allowing larger vehicles to be brought into a mine with limited access. The modular units have modular coupling means that allow the modular units to be assembled and disassembled as needed. The use of modular units also allows individual modules to be replaced if damaged, rather than requiring replacement of the entire vehicle. It is further preferred that the vehicle be constructed of at least three modules, a forward module, a rear module, and a cab module. The foreword module houses an engine and includes a cab shield and undercarriage. Alternatively, the forward module could be described as a module configured to house the engine and transmission as well as to provide a ledge extending under a substantial portion of the cab. The forward module is of unitized construction. The rear module couples to the forward module, either directly or via an intermediate structure, and is fitted with one of a variety of rear deck or truck bed configurations, depending on the intended current use of the vehicle. The cab module houses the operator, and cab coupling means are provided to maintain the cab in position with respect to the forward module and the rear module. Preferably, the cab module is of unitized construction with a cage for the safety of the operator and is so mounted that the operator rides above the cab shield and undercarriage of the forward module. For the added comfort of the operator, the cab coupling means preferably provide for shock mounting of the cab to the forward module and with respect to the rear module.

The vehicle of the present invention also provides a rear suspension system which is configured to better shield a rear axle assembly of the rear module from damage, as well as to allow for a substantial degree of freedom for movement of the rear axle assembly to better accommodate movement over uneven terrain, while still maintaining alignment of wheels mounted to the rear axle assembly. The rear suspension system has utility for applications beyond the modular mine service vehicle described above. In particular, the rear suspension system increases the stability of the rear axle against twisting and reduces the need for tie bars between the axle and the frame or complementary leaf springs. This is of particular importance when the wheels are driven.

The forward module has a forward frame section which is of unitized construction and has a pair of forward side members, each of which terminates in a front axle saddle and in a forward member horizontal section which is attached to a forward module terminating plate. The forward member horizontal sections form a frame for a ledge which serves as part of the cab shield and undercarriage. Gusset plates reinforce the connection attaching the forward module terminating plate to the forward member horizontal sections. Preferably, the forward frame section is integrated with front body and fender panels, and optionally with a front bumper, to provide a unitized forward body structure.

It is preferred for the front axle saddles to have undercarriage stringers that tie across open bottom sides of the saddles and which are so configured that a front axle assembly of the forward module resides above these undercarriage stringers.

The rear module has a rear frame section which has a pair of rear side members, each of which has a rear member horizontal section and a rear member inclined section which is attached to a rear module terminating plate. Each of the rear member horizontal sections preferably terminates in a rear bracket, the rear brackets providing attachment sites for a closure structure of the rear frame section. Such a closure structure can be provided by various elements, such as a bumper or step-down extension, these elements providing additional rigidity for the rear frame section. A cross brace is attached between the rear member horizontal sections in close proximity to the rear member inclined sections. Preferably, the cross brace is a K-brace.

Frame coupling elements are provided, which rigidly affix the forward module terminating plate to the rear module terminating plate. One preferred frame coupling assembly is a series of bolt receptor plates and corresponding bolts. Each of the bolt receptor plates has threaded passages therein. The bolt receptor plates can be affixed behind one of the terminating plates and positioned such that the threaded passages are aligned with bolt passages extending through the terminating plates. Bolts are then used to attach the terminating plates together. A reinforcing plate is preferably positioned behind one of the terminating plates, and tension sleeves are preferably used to allow longer bolts to be employed so as to provide a sustained adjustable pressure. Alignment tabs are preferably provided to facilitate placing the terminating plates together with the bolt holes aligned. The alignment tabs can be placed on the bolt receptor plates or, alternatively, on one of the terminating plates.

Optionally, a frame extender can be interposed between the forward and rear module terminating plates to extend the frame of the vehicle to provide a ledge extension and/or to allow a longer bed to be mounted to the rear frame section. The frame extender terminates in engagement plates which are designed to attach to the forward and rear module terminating plates with complementary affixing means that match the associated frame coupling elements. The engagement plates are rigidly held parallel to each other by an extender brace structure.

The rear frame section preferably has bed flanges attached to the rear side members. The bed flanges provide attachment sites for a truck bed. The attachment of the truck bed to the bed flanges is preferably achieved by fasteners such as bolts to allow interchangeability of the bed. Examples of truck beds which can be attached are a flat bed, a bench bed having a step-down central section, or a deck for supporting a scissors lift. Preferably, the closure structure that attaches to the rear brackets is configured to correspond to the truck bed employed; in the case of a bench bed having a lowered center section, the closure structure has a central lower section, and in the case of an extended truck bed, the closure structure can include rear member extensions to support the extended truck bed. An extended truck bed could also be accommodated by employing the frame extender to provide additional length behind the forward frame section.

The cab coupling elements are preferably resilient couplings. In one embodiment, a cab front mounting element attaches to the forward module, and a cab back mounting element attaches to the rear module either directly or, in some situations where the frame is extended via the frame extender, the cab back mounting element attaches to the frame extender. The frame extender can also be used to allow a longer cab to be mounted so as to increase the number of passengers that can be accommodated in the cab.

The improved rear suspension system has a pair of arm assemblies, each having an axle support bar terminating in a support bar mount that extends normal to the support bar. Each of the support bar mounts in turn terminates in a pair of mount end surfaces. Each of the support bar mounts has a mount passage therethrough which is configured to accept a pair of compliant mount bearings, each having a mount bearing passage therethrough. The mount bearings are configured to slidably engage the mount passage in the support bar mounts. Each of the mount bearings has a mount bearing flange which seats on one of the mount end surfaces of the support bar mount. Each arm assembly also has a pair of axle support brackets, the pair of axle support brackets attaching to the vehicle frame and, when attached, being positioned so as to provide a pair of spaced apart bracket faces. In the preferred vehicle having the frame structure discussed above, the axle support brackets are preferably mounted to the rear member inclined sections of the rear side members. Having the axle support brackets so positioned provides some shielding for the undercarriage of the vehicle against bottoming out by leaving the suspension free to move up when the undercarriage bottoms out, thereby avoiding damage to the rear suspension system. The axle support brackets have bracket passages therethrough, which are configured to hold bracket bearings which in turn have bracket bearing passages therethrough. The bracket bearings are provided with bracket bearing flanges which reside on the spaced apart bracket faces of the axle support brackets. When mounted to the frame, the axle support brackets are positioned so as to accommodate the support bar mount with the mount bearing flanges and the bracket bearing flanges therebetween, the separation being such as to place the bearing flanges under a compressive load when the support bar mounts are installed between the axle support brackets. A pivot bolt is provided, which passes through the passages in the bearings, thereby maintaining the bearings in alignment such that they will be in frictional contact when subject to rotation. Preferably, a slip washer is interposed between mating surfaces of the bearing flanges. The pivot bolt is also preferably configured such that it will slidably engage the passages in the bearings. Preferably, the pivot bolt is provided with retaining washers and is secured with respect to the support bar mount and related elements by a nut.

The above described structure floatably mounts the axle support bars in the mount bearings and the bracket bearings so as to bias each of the axle support bars toward a neutral position where the axle support bar resides in a plane to which a nominal pivot axis, defined by the bracket passages, is perpendicular, while allowing substantial twisting motion in directions other than in this plane, and also allowing limited translation along the nominal pivot axis. This resilient, floatable mounting limits sideways movement of the wheels by providing a reaction torque to counter off-axis tilting of the axle support bars. The motion of the wheels is limited, in part, by the compressibility of the bearing flanges as well as by the sizing and geometry of the support bar mount, the axle support brackets, and the bolt. To reduce the amount of sideways movement of the wheels, the separation between each pair of axle support brackets can be increased, with the length of the associated support bar mounts being similarly increased while maintaining a constant flange thickness for the bearings. Increasing the length of the bearings and the bracket passages will also decrease the sideways movement of the wheels.

To further limit sideways motion of the wheels, a rear link bar is preferably provided. The rear link bar is pivotably attached at one end to one of the rear side members, and at the other end to the axle support bar on the opposite side of the vehicle to limit motion of the axle support bars relative to the rear frame section.

The vertical movement of the axle is limited by a spring positioned between each axle support bar and the rear frame section. A shock absorber can also be provided between each axle support bar and the frame.

BRIEF DESCRIPTION OF THE FIGURES

FIG. 1 is an isometric view of an improved mine service vehicle which forms one embodiment of the present invention; the vehicle is viewed from above. The mine service vehicle has a modular construction having a forward module, a rear module, and a cab module (as better shown in the exploded view of FIG. 2). The forward module houses an engine and has a forward frame section that is supported on a front axle assembly. A hood is provided to cover the engine. The rear module couples to the forward module and supports a truck bed, which is shown as a flatbed in FIG. 1. The cab module is resiliently coupled to the combined forward and rear modules (as illustrated in FIGS. 3 and 5) and serves to house an operator and additional personnel.

FIG. 2 is an exploded isometric view of the modules shown in FIG. 1. The forward frame section of the forward module forms one half of a vehicle frame and, in this embodiment, is further strengthened by integration with body and fender panels formed of plate stock. The forward frame section includes a forward module terminating plate. The cab module mounts to the vehicle frame with the personnel-carrying portion of the cab residing substantially within the footprint of the integrated forward frame section and body. The rear module has a rear frame section with a pair of rear side members, each having a rear member horizontal section and a rear member inclined section which is attached to a rear module terminating plate. The rear side members are affixed to each other by a K-brace extending between the rear side members and by a tail structure attached to the rear side members. The forward module terminating plate and the rear module terminating plate are connected together by bolts that thread into bolt receptor plates. The truck bed, shown in phantom in FIG. 2, is attached to bed flanges affixed to the rear side members.

FIG. 3 also illustrates a cab coupling which is one of four such cab couplings that resiliently attach the cab module to the vehicle frame.

FIG. 4 shows a pair of arm assemblies that provide an improved suspension structure, as better illustrated in FIGS. 5, 7 and 8.

FIG. 9 is a partial isometric view of another vehicle embodiment having a frame extender. In this embodiment, the same forward module and cab module shown in FIGS. 1-5 are employed with a slightly different rear module to allow an extended bed to be fitted on the vehicle. The rear module of this embodiment has a suspension system that has been modified to position springs in a better location to support the weight of the extended bed.

FIG. 10 illustrates a scissors lift truck bed, while FIG. 11 illustrates an extended personnel-carrying truck bed with a depressed center section.

DETAILED DESCRIPTION OF THE PREFERRED EMBODIMENTS

Figure 1:
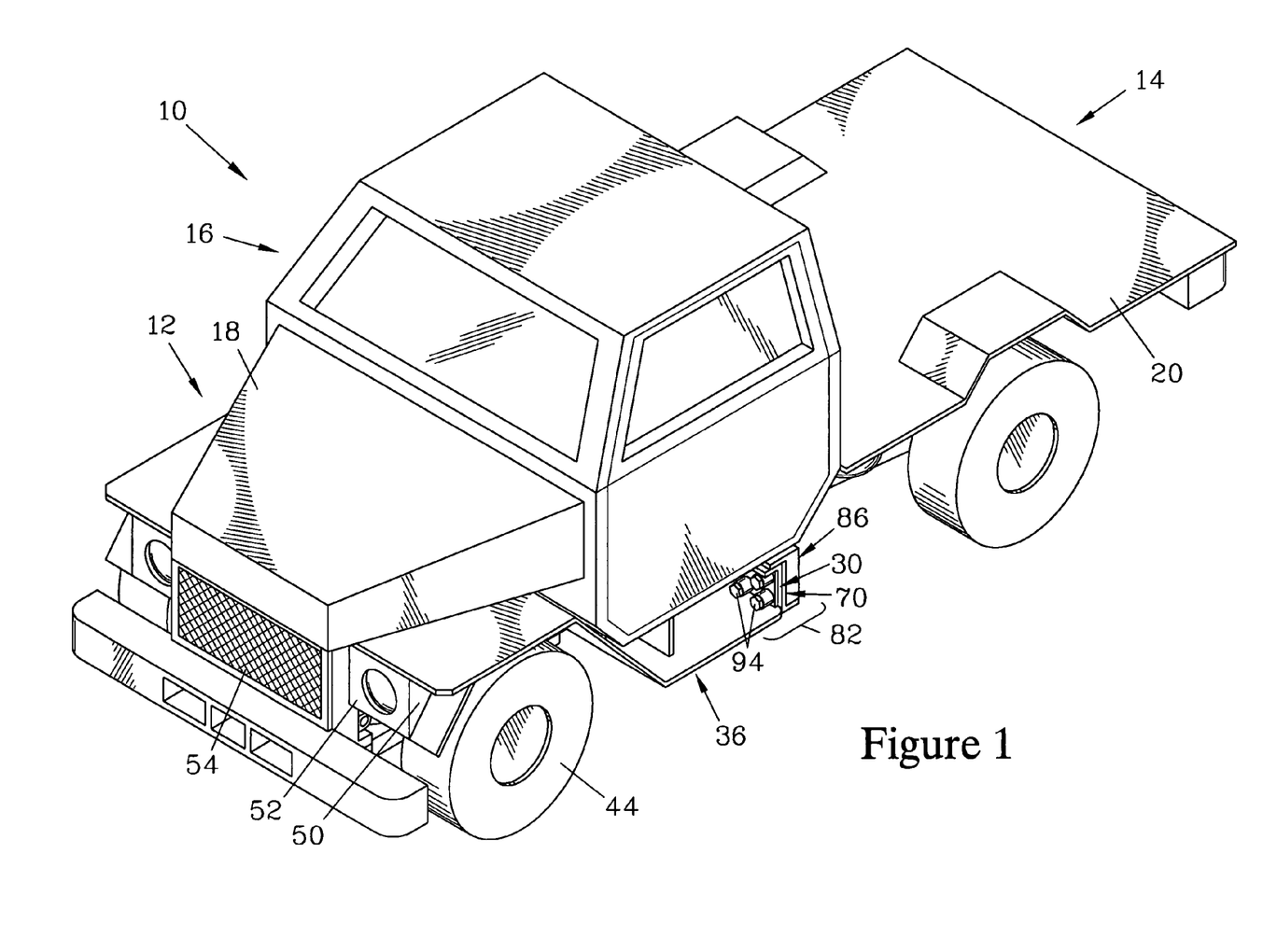

FIG. 1 is an isometric view of an assembled mine service vehicle 10 which forms one embodiment of the present invention, viewed from above. The mine service vehicle 10 has three modules, a forward module 12, a rear module 14, and a cab module 16. Having the mine service vehicle 10 so constructed facilitates the introduction of the mine service vehicle 10 into a mine where there are frequently constricted entry tunnels and/or shafts through which it is necessary to pass the vehicle 10 before it reaches the mine caverns where it will be placed in service. Furthermore, this modular construction allows replacement of any one module (12, 14, 16) which becomes damaged without requiring replacement of the entire vehicle 10. Frame coupling means are provided to rigidly connect the forward module 12 to the rear module 14, while cab coupling means connect the cab module 16 to forward and rear modules (12, 14). While the modules (12, 14, 16) can be assembled by welding the modules (12, 14, 16) together once introduced into the work area of the mine, it is preferred that the modules (12, 14, 16) be connected with coupling means such as discussed below that allow the modules to be assembled and disassembled, thereby allowing for the reconfiguration of the service vehicle 10 in the mine as well as for the removal from the mine for service or for relocation to another mine site. Furthermore, it is preferred for the cab module 16 to be mounted to the forward and rear modules (12, 14) by resilient coupling means such as discussed below to reduce transmission of shocks and vibrations to the cab module 16.

Figure 2:
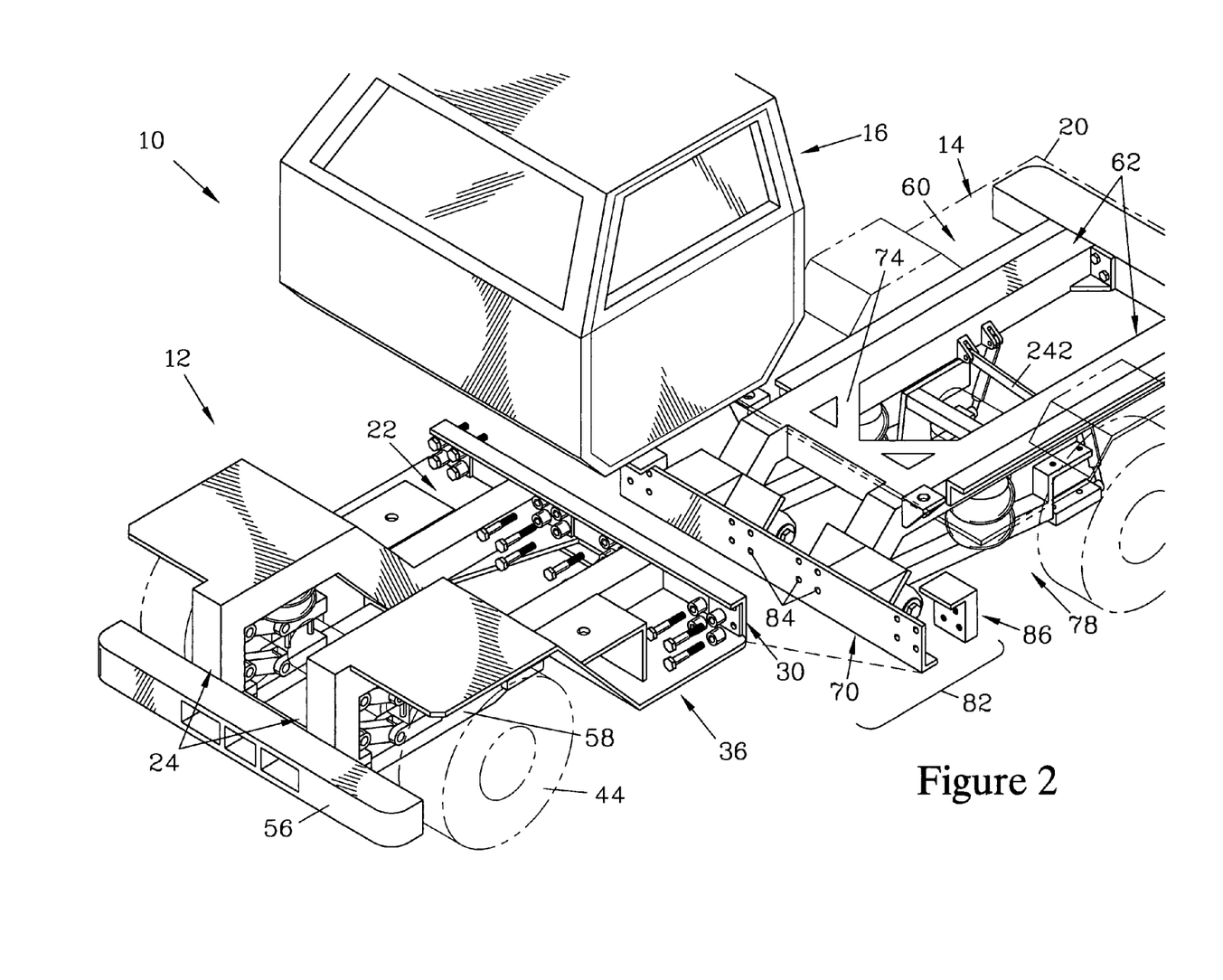

FIG. 2 illustrates the mine service vehicle 10 of FIG. 1 in a partially exploded view, with the forward module 12 being shown without a hood 18 (the hood 18 is shown in FIG. 1) or an engine. The rear module 14 has a bed 20 (shown in phantom in FIG. 2). The cab module 16 is preferably of unitized construction to better protect the occupants from falling debris and other hazards. It is further preferred that the cab module 16 be formed with an occupant cage (not shown) to further protect the occupants of the cab.

Figure 3:
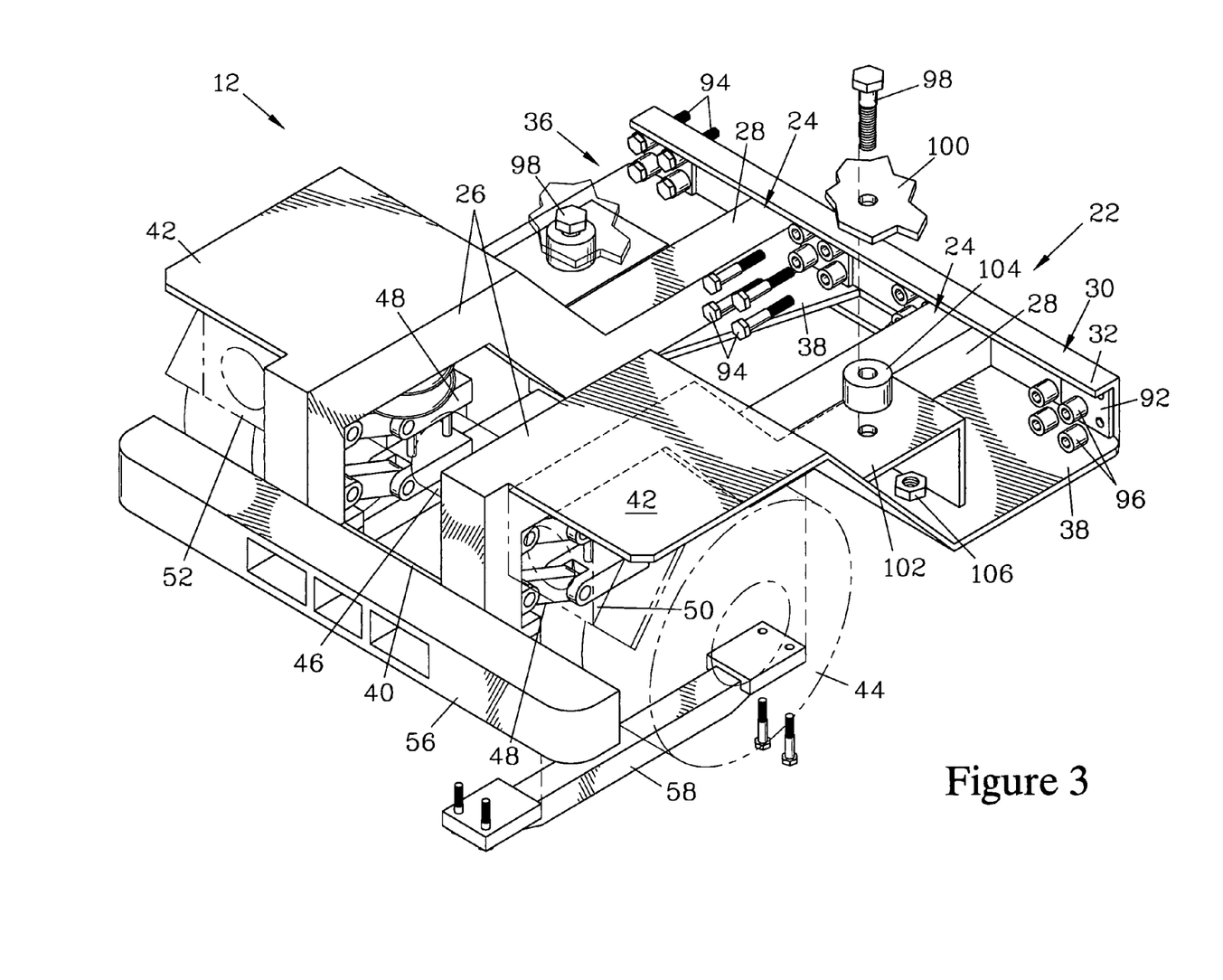
FIG. 3 is an isometric view showing the forward module partially exploded to better illustrate its structure and to show one of two undercarriage stringers which are attached to the forward frame section.

As better shown in FIG. 3, the forward module 12 has a forward frame section 22 which in turn has a pair of forward side members 24, each of which terminates in a front axle saddle 26 and a forward member horizontal section 28. A forward module terminating plate 30 is affixed to the two forward member horizontal sections 28. In this embodiment, the forward module terminating plate 30 is a channel having an upper flange 32 and a lower flange 34 (shown in FIGS. 5 and 6) which increases the rigidity of the terminating plate 30. The forward member horizontal sections 28 and the terminating plate 30 serve as part of a cab shield and undercarriage 36 that forms a ledge, above which the forward section of the cab module 16 is attached, which shields the cab module 16 from damage in the event of glancing impact of the vehicle 10 with objects. Gussets 38 attach to the terminating plate 30 and the forward member horizontal sections 28 to increase the rigidity of the forward frame section 22 and add structure to the cab shield and undercarriage 36 to increase its strength and impact resistance. Closure of the forward frame section 22 is provided by a front cross member 40 (better shown in FIG. 5). Additional cross members may be included as necessary to further stiffen the forward module 12 and/or to provide mounting locations for the engine and/or a transmission.

Figure 5:
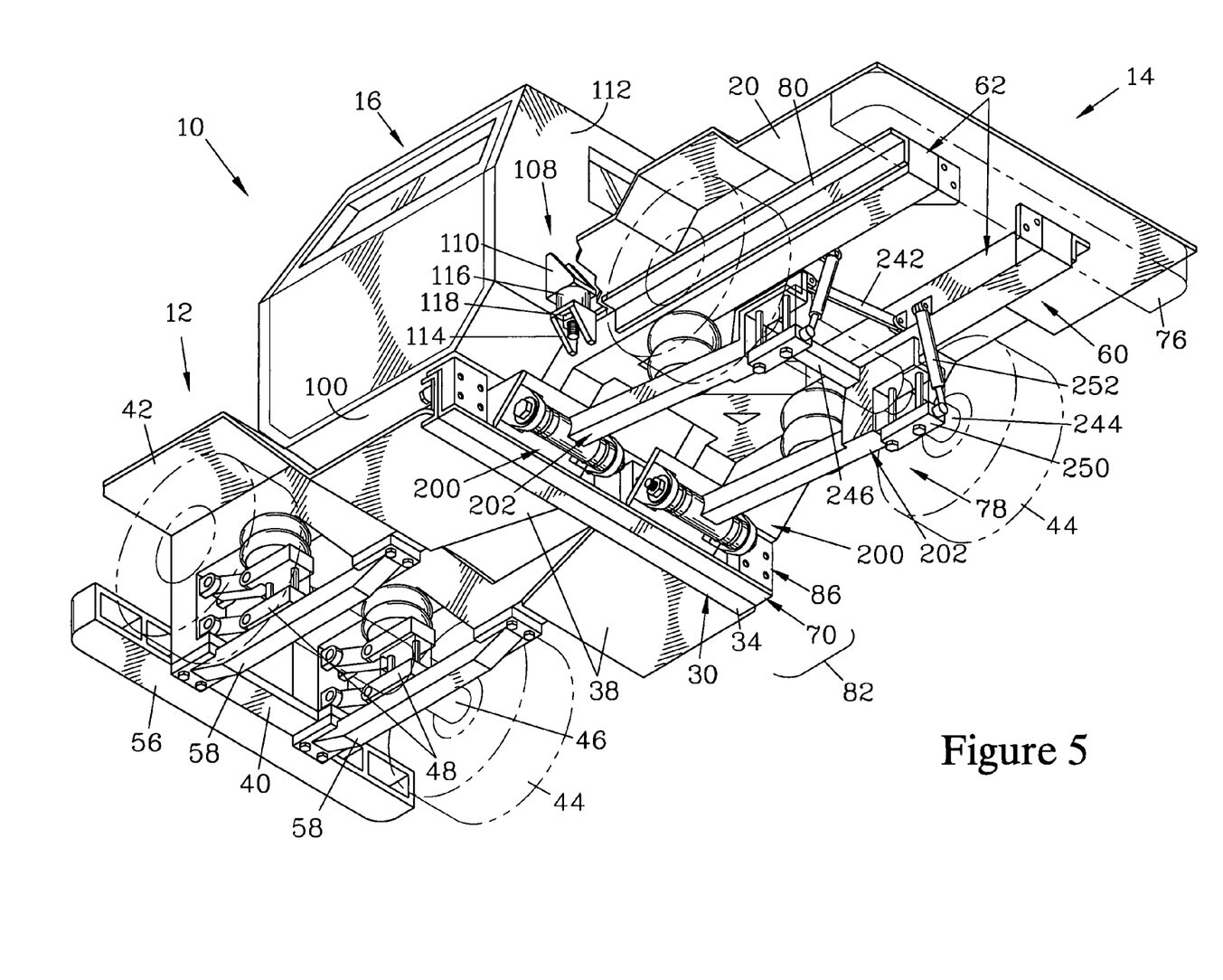
FIG. 5 is an isometric view of the mine service vehicle shown in FIG. 1, but seen from below to better illustrate the structure. A pair of back hold-down tabs (only one of which is visible) is attached to the rear frame section, and each back hold-down tab is resiliently coupled to a cab back bracket attached to the cab.

Front fenders 42 attach to the forward frame section 22 and cover wheels 44. In the mine vehicle 10, the front fenders 42 are affixed to the forward frame section 22. The front wheels 44 are in turn mounted on a front axle assembly 46 (shown in phantom), which is supported by axle support fixtures 48 which are linked to the front axle saddles 26 of the forward side members 24. Side panels 50 and front panels 52 (shown in FIG. 1 and in phantom in FIG. 3) further close in the front module 12. It is preferred that the forward side members 24 and the body panels (50, 52) be joined by welding to enhance the rigidity of the forward module 12. While the front fenders 42 and the panels (50, 52) in this embodiment are affixed to the forward frame section 22, in some embodiments it may be preferable to have some or all of these elements removable to allow better access for working on the engine; this could be readily accomplished by affixing some or all of these elements to the hood 18. Furthermore, in some embodiments it may be practical to form a rear portion of the front fenders as part of the cab module, rather than the forward module. A radiator grille 54 (shown in FIG. 1) is positioned between the front panels 52 and below the hood 18 and is attached to the forward frame section 22. A front bumper 56 is also provided, which can be either a bolt-on structure or can be welded into position to increase the rigidity of the unitized forward module 12, in which case the front cross member 40 may be redundant.

It is preferred for the front axle saddles 26 to be fitted with bolt-on undercarriage stringers 58. These undercarriage stringers 58 are contoured such that the front axle assembly 46 will ride above them and they will help protect the front axle assembly 46 from damage, as well as closing the open ends of the front axle saddles 26 to strengthen the forward module 12.

Figure 4:
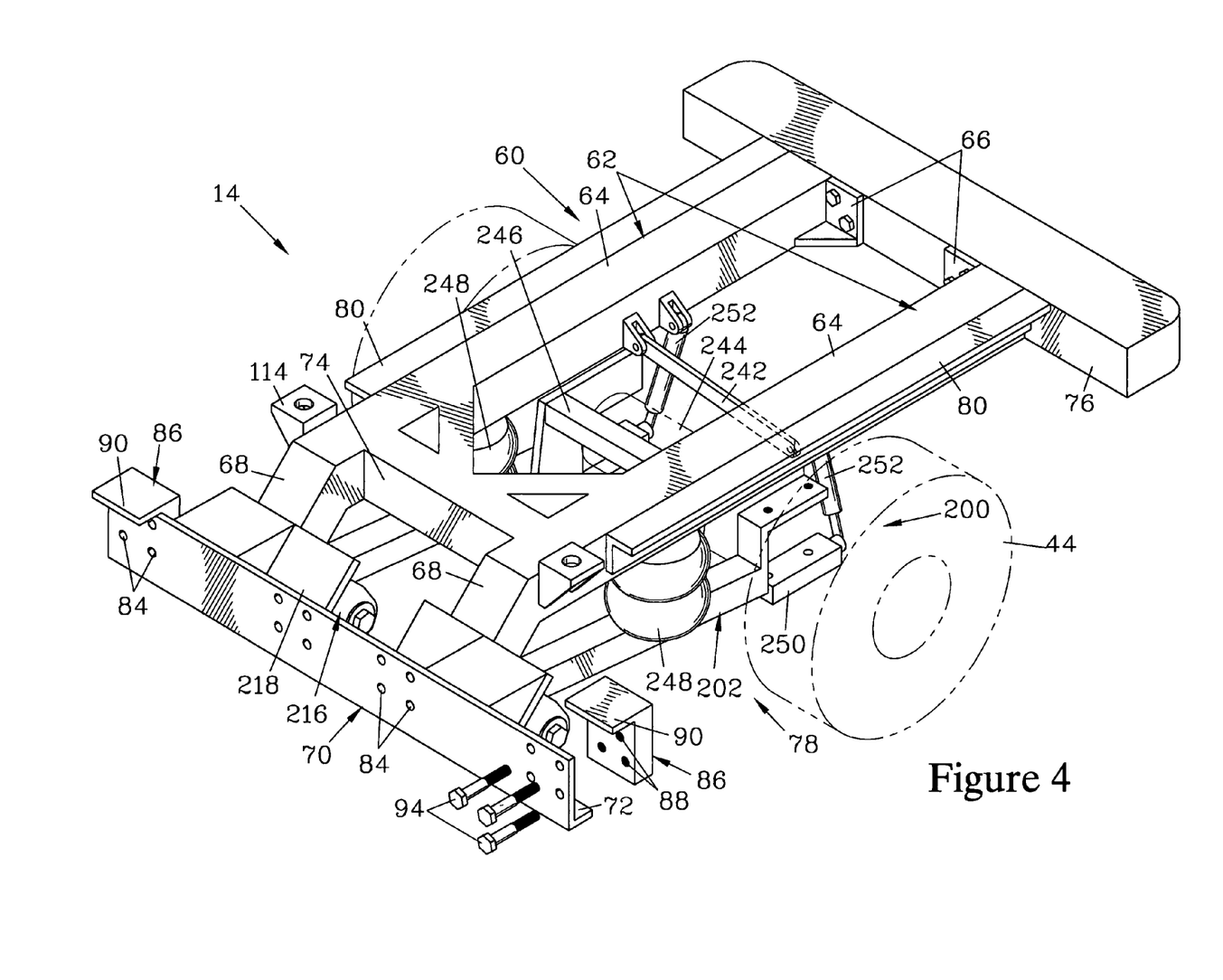
FIG. 4 is an isometric view of the rear module, with the truck bed removed for purposes of illustration.

FIG. 4 better illustrates a rear frame section 60 which forms part of the rear module 14. The rear frame section 60 has a pair of spaced apart rear side members 62, each of which has a rear member horizontal section 64, terminating in a rear bracket 66, and a rear member inclined section 68. A rear module terminating plate 70 attaches to the rear member inclined sections 68. In this embodiment, the rear module terminating plate 70 has an L-shaped cross section with a lower flange 72 to increase its rigidity. A K-brace 74 is attached between the pair of spaced-apart rear side members 62 and is located in close proximity to the rear member inclined sections 68. In this embodiment, a rear bumper 76 is bolted to the rear brackets 66. An improved rear suspension system 78, discussed in greater detail below with regard to FIGS. 5-8, is pivotally attached to the rear member inclined sections 68. Bed flanges 80 attached to the rear member horizontal sections 64 are used to attach the bed 20; the bed 20 can be attached by fasteners or welded to the bed flanges 80. The rear bumper 76 illustrated has been selected to accommodate and provide partial support for the bed 20. Again, additional cross members may be included as necessary to increase the rigidity of the rear frame section 60 and/or to serve for mounting additional elements, such as a fuel tank. Additionally, such cross members may aid in keeping the rear side members 62 parallel during assembly.

The forward module 12 is attached to the rear module 14 with a frame coupling assembly 82 which brackets the forward module terminating plate 30 and the rear module terminating plate 70, as shown in FIG. 1 and in greater detail in FIGS. 2 and 5. In this embodiment, the terminating plates (30, 70) have four sets of matched holes 84 which pass therethrough (shown in the rear module terminating plate 70 in FIGS. 2 and 4, and shown in the forward module terminating plate 30 in FIG. 6). Associated with each of the set of holes 84 is a bolt receptor plate 86 which has threaded passages 88 therein which are aligned to match the sets of bolt holes 84. Each of the bolt receptor plates 86 is preferably affixed to the rear module terminating plate 70 and is provided with an indexing tab 90 which is positioned to engage the upper flange 32 of the forward module terminating plate 30 when the elements of the coupling assembly 82 are positioned such that the hole patterns are vertically aligned. The indexing tabs 90 aid in aligning the terminating plates (30, 70).

As shown in FIG. 3, reinforcing plates 92 are mounted behind the forward module terminating plate 30. Bolts 94 are provided, which pass through tensioning sleeves 96 which hold the tightened bolts 94 under a tension load, assuring that the terminating plates (30, 70) will be able to withstand a moment to maintain the frame sections (22, 60) in alignment.

The dimensions and materials employed for the bolts 94 and the tensioning sleeves 96 will depend, in part, on the size and anticipated use of the vehicle 10. For a general purpose vehicle, it has been found practical to employ bolts and tensioning sleeves fabricated from low carbon steel, where the bolts were 1" in diameter and the tensioning sleeves had an i.d. of 1⅛", an o.d. of 1⅞", and were about 2⅜" in length.

As shown in FIG. 1, the cab module 16 is mounted to the forward module 12 and the rear module 14 in a position where it resides in part over the forward module 12 and is positioned such that the personnel carrying portion of the cab module 16 resides predominantly above the ledge provided in part by the cab shield and undercarriage 36 of the forward module 12. The remainder of the cab module 16 resides over the rear module 14. The connection of the cab module 16 is via cab coupling means which employ front cab bolts 98 (shown in FIG. 3) which pass through a floor 100 of the cab module 16, allowing the floor 100 to serve the function of a cab front mounting element. The front cab bolts 98 pass through front hold-down tabs 102 affixed on the forward frame section 22, with resilient spacers 104 interposed between the floor 100 and the front hold-down tabs 102. The front cab bolts 98 are held in place by nuts 106, and the combination of these elements (98, 100, 102, 104, 106) serve to resiliently secure the cab module 16 to the forward module 12. These elements are best illustrated in FIG. 3, while FIG. 5 illustrates one of two rear tab and bolt assemblies 108 that support the rear of the cab module 16 and serve to resiliently secure the cab module 16 to the rear module 14. Cab back tabs 110 attach to a rear surface 112 of the cab module 16 to provide a cab back mounting element. Aligned below and attached to the rear member horizontal sections 64 of the rear frame section 60 are rear hold-down tabs 114 (best shown in FIG. 4). Positioned between the tabs (110, 114) are resilient rear spacers 116, and each of the rear tab and bolt assemblies 108 has a nut and bolt 118 passing through the back cab tab 110, the resilient rear spacer 116, and the rear hold-down tab 114. While the floor 100 of this embodiment serves the function of a cab front mounting element, discrete tabs that resemble the cab back tabs 110 illustrated but which extend forward from the cab module 16 could be employed to provide the cab front mounting element if the position of the front hold-down tabs is altered.

Figure 6:
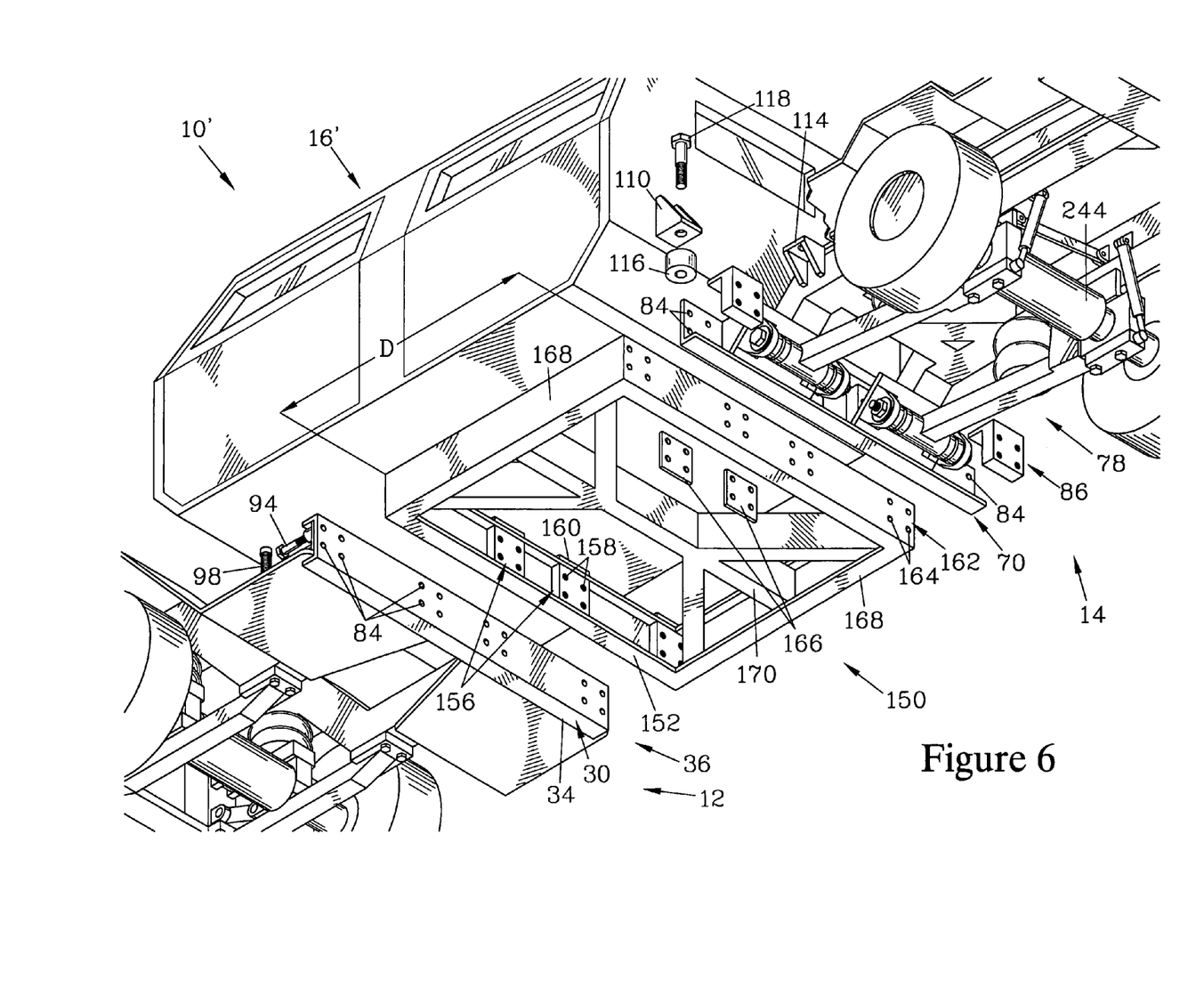
FIG. 6 is an exploded partial isometric view of the same forward module and rear module as shown in FIG. 5, but employed in combination with an enlarged cab to allow the vehicle to carry additional personnel. To accommodate the increased length of the enlarged cab, the vehicle frame includes a frame extender that is configured to mount between the forward module terminating plate and the rear module terminating plate.

FIG. 6 is an isometric view of a stretched version of a mine service vehicle 10' which incorporates the forward module 12 and the rear module 14 of the embodiment shown in FIGS. 1-5, but which also has a frame extender 150. In the mine vehicle 10', the frame extender 150 serves to extend the ledge formed by the cab shield and undercarriage 36 to allow mounting an extended cab module 16' which can house a greater number of personnel than the cab module 16 shown in FIGS. 1, 2, and 5.

The frame extender 150 terminates in a front engagement plate 152 which has a hole pattern (not shown) to match the sets of bolt holes 84 of the forward module terminating plate 30. Extender bolt receptor plates 156 are attached to the front engagement plate 152, and have threaded passages 158 to accept bolts 94 passed through the forward module terminating plate 30. Extender receptor plate support tabs 160 assure vertical alignment with the holes 84 in the forward module terminating plate 30. Spaced apart from the front engagement plate 152 is a back engagement plate 162 having a pattern of holes 164 to match the sets of bolt holes 84 in the rear module terminating plate 70. The back engagement plate 162 has reinforcing plates 166, two of which are shown exploded from the back engagement plate 162. The front engagement plate 152 and the back engagement plate 162 are spaced apart at a distance D, which equals the length to be added to the mine service vehicle 10' when compared to the mine service vehicle 10. Spacers 168 of length D are attached to the front engagement plate 152 and the back engagement plate 162 to complete the periphery of the frame extender 150. The peripheral segments (152, 162, 168) illustrated are made from channel stock to increase the rigidity of the frame extender 150, which is further stiffened by an internal extender brace structure 170.

While the additional length provided by the frame extender 150 is used to allow mounting an extended cab module 16' in this embodiment, the additional length provided by a frame extender could also be used to allow a longer bed to be mounted to the rear frame section 60; this option is discussed below with respect to FIG. 9.

Figures 7, 8:
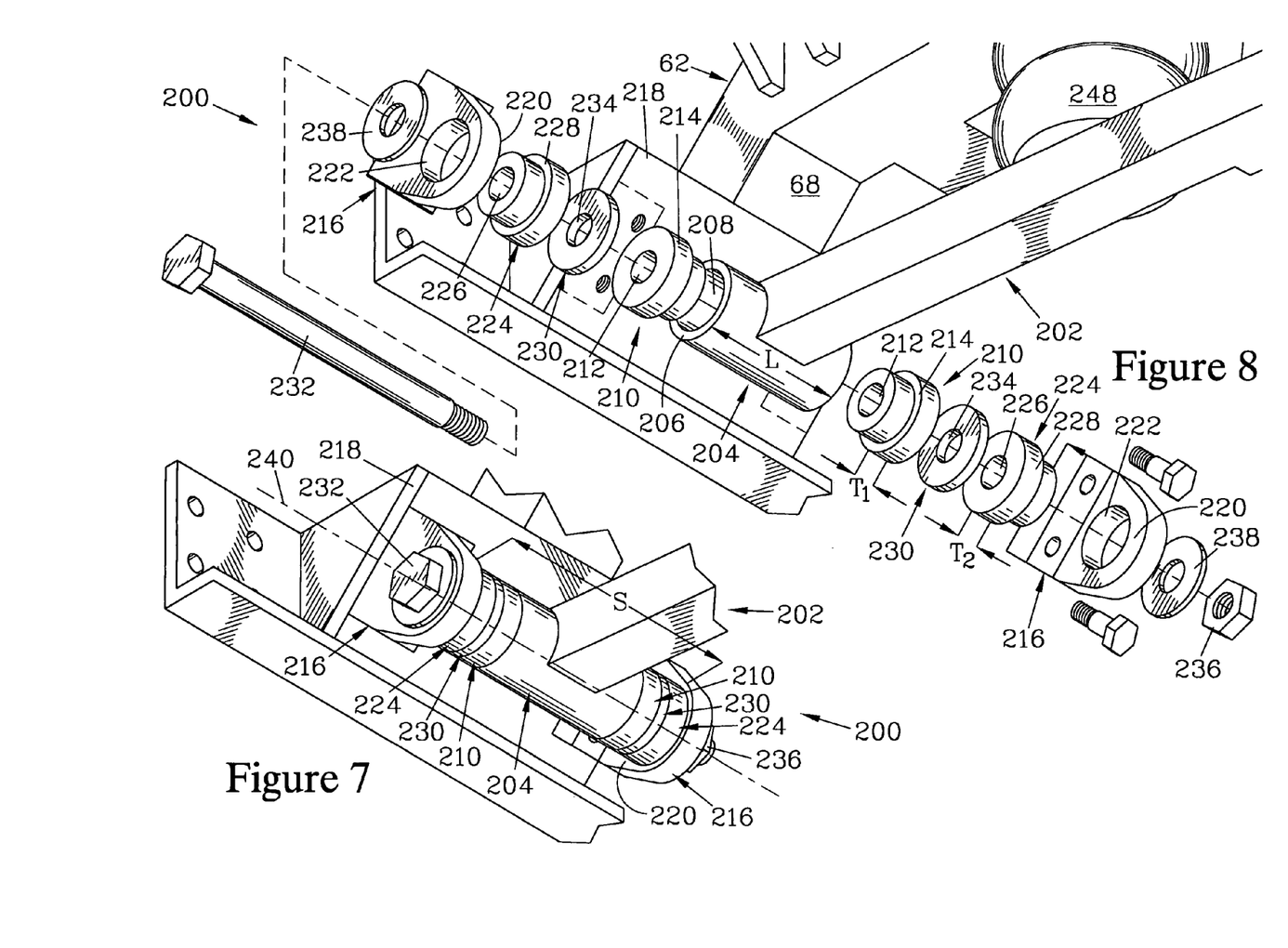
FIG. 7 is an enlarged partial isometric view better illustrating one of the arm assemblies that forms a part of the improved suspension system, the arm assembly having an axle support bar, an associated pair of axle support brackets, a series of compliant bearings, and a pivot bolt.
FIG. 8 illustrates the axle support bar, axle support brackets, bearings, and pivot bolt shown in FIG. 7, exploded to better show the compliant bearings which allow motion between the axle support bar and the axle support brackets about a nominal pivot axis, as well as allowing a limited degree of off-axis tilting and lateral motion.

FIGS. 4-6 also illustrate the improved rear suspension system 78 which is incorporated in the mine service vehicles (10, 10'). The system 78 has a pair of arm assemblies 200, one of which is illustrated in detail in the isometric views of FIGS. 7 and 8. FIG. 7 illustrates the arm assembly 200 assembled, while FIG. 8 is an exploded view of the arm assembly 200.

The arm assembly 200 has a rear axle support bar 202, terminating in a support bar mount 204 that extends normal to the support bar 202. The support bar mount 204 in turn terminates in a pair of mount end surfaces 206 (only one of which is shown in FIG. 8). The support bar mount 204 has a mount passage 208 therethrough, which is configured to accept a pair of compliant mount bearings 210. Each of the mount bearings 210 is fabricated from a resilient material such as urethane and has a mount bearing passage 212 therethrough. The mount bearing 210 is configured to slidably engage the mount passage 208 in the support bar mount 204 and has a mount bearing flange 214 which seats on one of the mount end surfaces 206 and has a mount bearing flange thickness $T_1$.

A pair of axle support brackets 216 are provided for the axle support bar 202. The pair of axle support brackets 216 attach to a base plate 218 which in turn attaches to one of the rear member inclined sections 68 of one of the rear side members 62. The axle support brackets 216, when attached to the base plate 218, are positioned so as to provide a pair of spaced apart bracket faces 220.

The axle support brackets 216 have bracket passages 222 therethrough which are configured to hold compliant bracket bearings 224, which are fabricated from a resilient material similar to that used for the mount bearings 210. The bracket bearings 224 have bracket bearing passages 226 therethrough, and are provided with bracket bearing flanges 228 which rest on the spaced apart bracket faces 220 of the axle support brackets 216 and each have a bracket bearing flange thickness $T_2$. A slip washer 230 made from a rigid, low friction material such as nylon is interposed between each of the mount bearings 210 and the associated bracket bearing 224. When mounted to the base plate 218, the axle support brackets 216 are positioned so as to accommodate the support bar mount 204 with the mount bearing flanges 214, the slip washers 230, and the bracket bearing flanges 228 therebetween, the bracket faces 220 being separated by a separation S selected such as to place the bearing flanges (214, 228) and the intermediate slip washer 230 under a compressive load when the support bar mounts 204 are installed between the axle support brackets 216. A pivot bolt 232 passes through the bearing passages (212, 226) and through a slip washer passage 234 in each of the slip washers 230. The pivot bolt 232 is secured in place by a nut 236, thereby maintaining the bearings (210, 224) and slip washers 230 in alignment such that they will be in frictional contact when subject to rotation. It is preferred for a pair of retaining washers 238 to be provided on the pivot bolt 232 to positively prevent axial motion of the pivot bolt 232 with respect to the axle support brackets 216.

The above described structure limits sideways movement of the wheels 44 associated with the rear module 14 by limiting off-axis tilting of the axle support bar 202, while allowing motion about a nominal pivot axis 240 (shown in FIG. 7), which is defined by the bracket passages 222. The sideways and off-axis motion is limited, in part, by the compressibility and thickness of the bearings (210, 224), as well as by the spacing of the bracket faces 220 relative to the support bar mount 204 and a length L of the support bar mount 204. Sideways translational movement of the axle support bar 202 relative to the axle support brackets 216 is limited by the compressibility of the bearings (210, 224) and the bearing flange thicknesses ($T_1$, $T_2$) of the bearing flanges (214, 228). The compressibility of the bearings (210, 224) will also affect the reaction torque that results from off-axis twisting of the support bar mount 204 with respect to the axle support brackets 216 caused by sideways motion of the wheels 44. This reaction torque will also be dependent on the radial thickness of the bearings (210, 224), which is determined by the difference in radii between the bearing passages (212, 226) and the mount passage 208 and the bracket passages 222. The configuration of the arm assembly 200 allows for both off-axis twisting of the support bar mount 204 with respect to the pivot bolt 232, and off-axis tilting of the pivot bolt 232 with respect to the axle support brackets 216, thereby providing greater freedom of movement of the axle support bar 202, while still providing a high degree of stability, since the compression of the bearings (210, 224) creates reaction torques to counter such tilting. To reduce the amount of off-axis tilting, the separation between the pair of axle support brackets 216 can be increased, with the length L of the associated support bar mounts 204 being similarly increased while maintaining a constant flange thickness ($T_1$, $T_2$) for the bearings (210, 224). A second mode of decreasing the twist can be accomplished by increasing the length of the bearings (210, 224) residing in the axle support brackets 216 and the mount passage 208, which will require thickening of the axle support brackets 216 and possibly lengthening of the mount passage 208. The degree of twist can also be adjusted by forming the bearings (210, 224) from a stiffer material which provides greater resistance to compression/deformation. All these parameters can be adjusted to provide the desired degree of resistance to twisting for the axle support bar 202.

In one example of the arm assembly 200 which has been found effective, the bearings (214, 224) are formed from a urethane having a nominal hardness of 90 durometer, which has been found more effective than a 70 durometer urethane material. In this example, the bolt 232 is 1½" in diameter, while the bearings (214, 224) have an i.d. of 1½" and an o.d. of 2¾" at the portion which slidably engages the bracket passage 222 or the mount passage 208, while the bearing flanges (214, 228) are 4" in diameter with a nominal flange thickness ($T_1$, $T_2$) of ½". The length L of the support bar mount 204 is 7", and the separation S between the bracket faces 220 is 9⅝". The slip washers 230 each have a thickness of ¼", and are formed of nylon. Other rigid materials having a low coefficient of friction should be useable, such as delrin or Teflon. Since the bearing flanges (214, 228) typically extend somewhat beyond their nominal thickness, the bearing flanges (214, 228) must be compressed slightly to allow the bearing flanges (214, 228), the slip washers 230, and the support bar mount 204 to be positioned between the bracket faces 220. This compression holds these elements together without any slop, so that any movement other than rotation about the nominal pivot axis 240 acts to compress the bearings (214, 224) and creates a reaction torque to return the axle support arm 202 to its neutral position.

The character of the flexibility provided by the arm assembly 200 might be described as providing a joint which floatably mounts the axle support bar 202 in the resilient bearings (210, 224) so as to bias the axle support bar 202 toward a neutral position where it resides in a plane that extends perpendicular to the nominal pivot axis 240 and is laterally centered between the bracket faces 220. Although the axle support bar 202 is biased to this neutral position, it is allowed substantial twisting motion in directions other than in this plane, and is also allowed limited translation along the nominal pivot axis 240.

To further limit sideways motion of the axle support bars 202, a rear link bar 242 (shown in FIGS. 2, 4, and 5) is preferably provided. The rear link bar 242 is pivotably attached at one end to one of the rear member horizontal sections 64, and at the other end to the rear axle support bar 202 on the opposite side. The restriction of sideways motion of the rear axle support bar 202 so connected also limits the sideways motion of the other, since the axle support bars 202 are connected together via a rear axle assembly 244, shown in phantom in FIGS. 4 and 5. The rear axle support bars 202 can also be connected together by a rear support crossbar 246, which serves as a convenient location for mounting brakes that engage a driveshaft (not shown) connected to the rear axle assembly 244.

The rear axle support bars 202 are configured to attach to the rear axle assembly 244 in such a manner as to position the rear axle assembly 244 substantially above the rear axle support bars 202. This provides some degree of protection for the rear axle assembly 244, as well as allowing the rear suspension system 78 to incorporate springs 248 interposed between each of the rear axle support bars 202 and the rear frame section 60 with a reduced overall height. The springs 248 illustrated are air springs, and in the rear module 14 illustrated the springs 248 are positioned between the rear axle assembly 244 and the support bar mounts 204. In this embodiment, the rear axle assembly 244 is attached to the rear axle support bars 202 by rear axle securing blocks 250 that are each bolted to the rear axle assembly 244 and to one of the rear axle support bars 202. The rear axle securing blocks 250 in this embodiment also each serve to connect to a shock absorber 252 that is mounted between the rear axle securing block 250 and one of the rear member horizontal sections 64 of the rear frame section 60.

Figure 9:
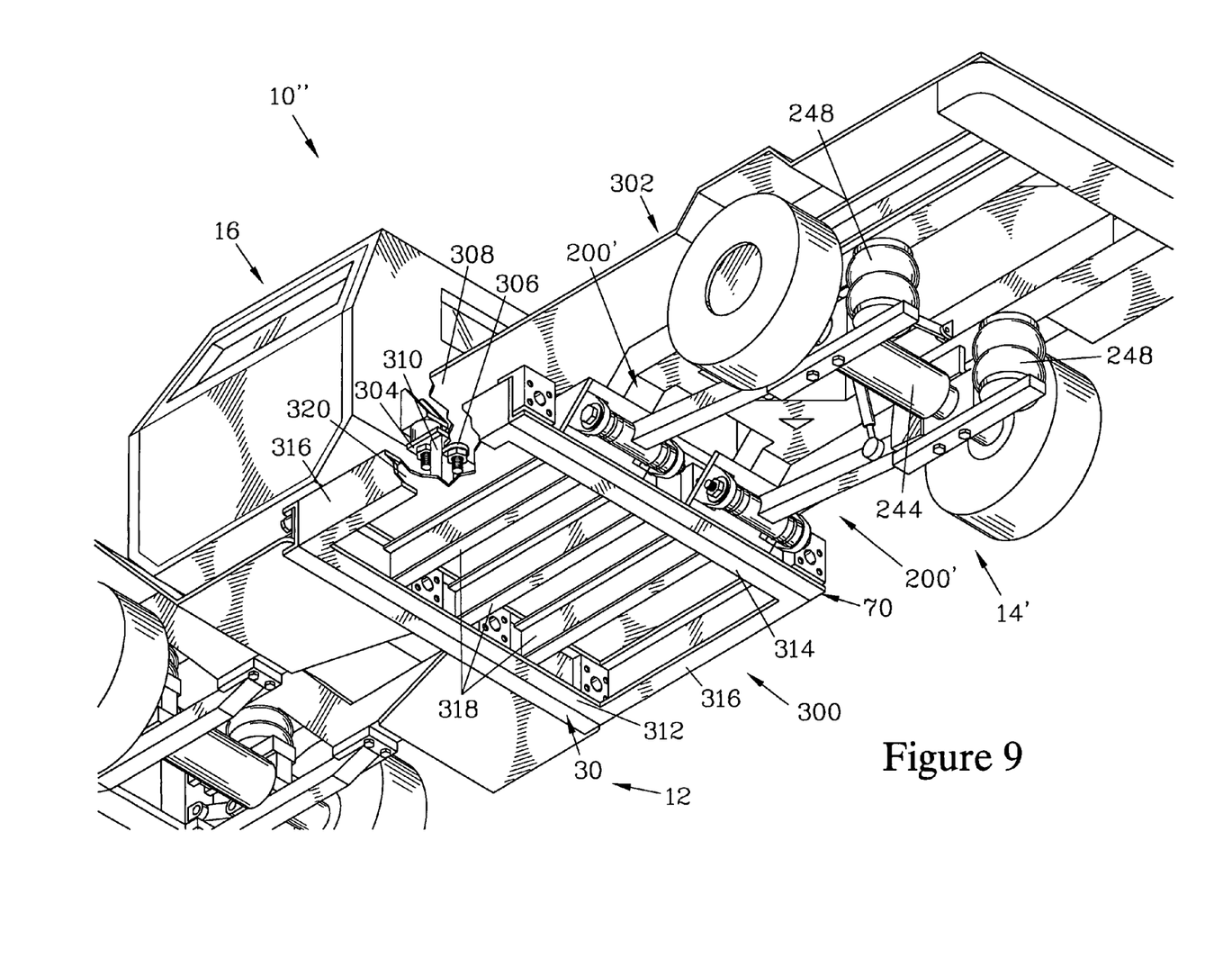

FIG. 9 is an isometric view of another stretched version of a mine service vehicle 10", where a frame extender 300 is employed to provide additional length to allow an extended bed 302 to be employed. The mine service vehicle 10" incorporates the forward module 12 and the cab module 16 of the embodiment shown in FIGS. 1-5, but employs a rear module 14' which is modified to better support the extended bed 302.

Since the cab module 16 is employed in this embodiment, the frame extender 300 is provided with extender hold-down tabs 304 (only one of which is shown) positioned to serve in place of the rear hold-down tabs 114 discussed above and shown in FIGS. 4 and 5; the extender hold-down tabs 304 serve to allow the cab module 16 to be secured to the frame extender 300. The frame extender 300 preferably also has extender bed support tabs 306 (again, only one is shown) to which a forward region 308 of the extended bed 302 can be secured. In the embodiment shown, the extender hold-down tabs 304 and the extender bed support tabs 306 are mounted to extender posts 310 that extend upward from the frame extender 300.

The frame extender 300, like the frame extender 150 shown in FIG. 6 and discussed above, has a front engagement plate 312 configured to be bolted to the forward module terminating plate 30, and a back engagement plate 314 configured to be bolted to the rear module terminating plate 70, the front engagement plate 312 and the back engagement plate 314 being affixed together by spacers 316. The frame extender 300 is reinforced by a number of extender stringers 318 and by an extender deck plate 320. When the frame extender 300 is affixed to the rear frame terminating plate 70, the extender hold-down tabs 304 are affixed with respect to the rear module 14'.

For the mine vehicle 10" illustrated, it is assumed that the extended bed 302 will be loaded such that the load center of gravity is likely to be near or to the rear of the rear axle assembly 244; to better accommodate this weight distribution, the rear module 14' is provided with arm assemblies 200' which replace the arm assemblies 200 employed in the embodiments shown in FIGS. 1-6. The arm assemblies 200' are extended to allow the springs 248 to be mounted aft of the rear axle assembly 244, rather than ahead of the rear axle assembly 244 as in the embodiments discussed earlier. In this position, the weight of the extended bed 302 is better balanced on the springs 248. In fact, for applications where the mine vehicle 10" is expected to support even heavier weights on the extended bed 302, a supplemental pair of springs could be placed ahead of the rear axle assembly in addition to the springs 248. While placing the springs 248 aft of the rear axle assembly 244 lengthens the arm assembly 200', this additional length is typically not a concern when using the extended bed 302. When reduced length in the mine service vehicle is preferred, the springs can be mounted ahead of the rear axle assembly, as shown in FIGS. 1, 2, and 4-6.

Figures 10, 11, 12:
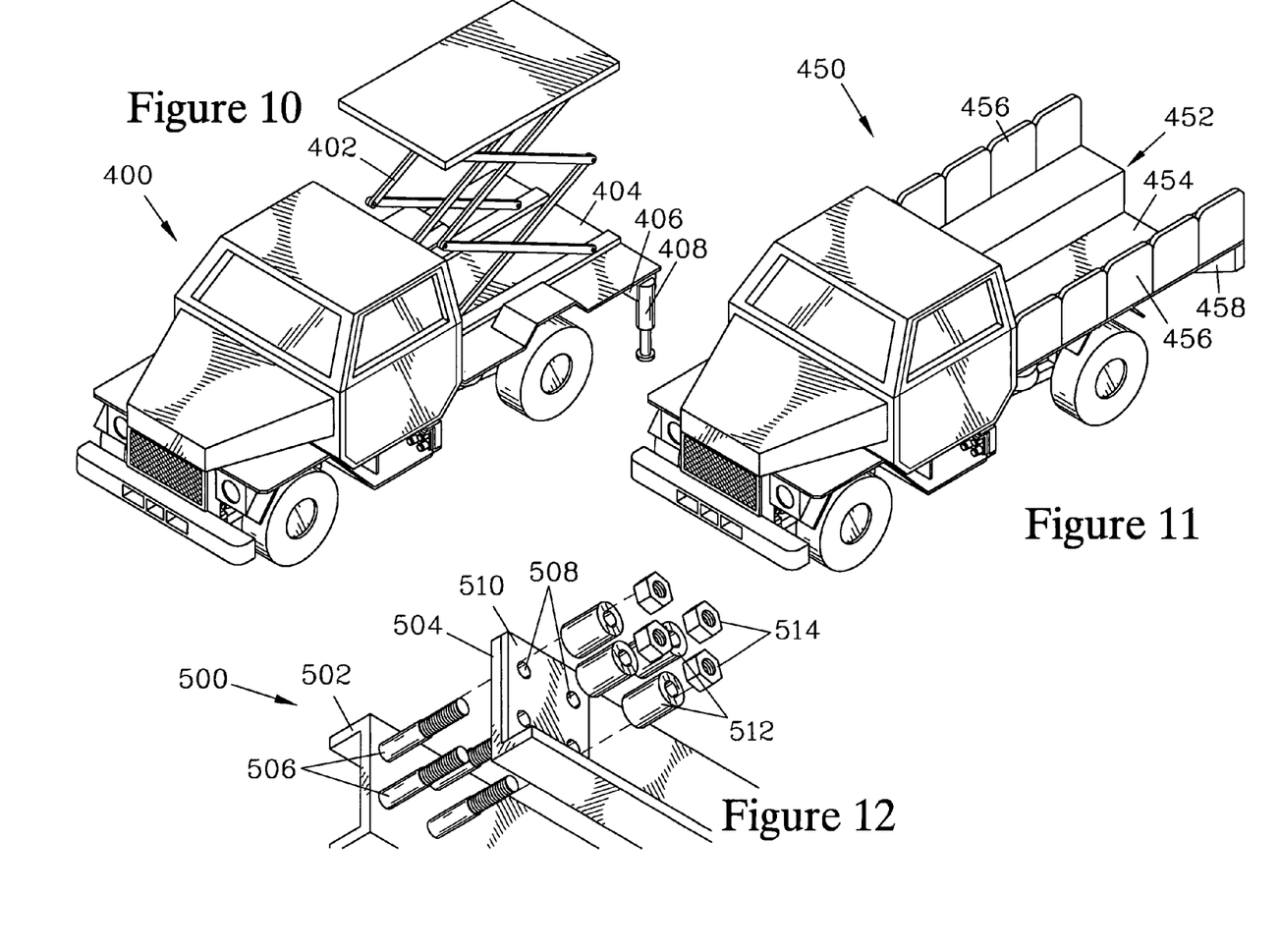
FIGS. 10 and 11 are isometric views illustrating two examples of truck beds that can be employed.
FIG. 12 is a partial isometric view illustrating an alternative frame coupling means which can be employed to secure a forward module terminating plate and a rear module terminating plate together.

The mine vehicles 10, 10' and 10" discussed above illustrate a few examples of how the vehicle of the present invention can be readily adapted to various uses by employing frame extenders, alternative cab configurations, alternative bed configurations, and/or alternative arm assemblies. FIGS. 10 and 11 illustrate examples of additional vehicle configurations.

FIG. 10 illustrates a mine service vehicle 400 that has a scissors lift 402 attached to a truck bed 404. The truck bed 404 is similar to the truck bed 20 illustrated in FIGS. 1 and 5. The mine service vehicle 400 has a rear bumper 406 with jacks 408 (only one of which is visible) affixed thereto to provide increased support when the scissors lift 402 is raised.

FIG. 11 illustrates a mine service vehicle 450 having a personnel-carrying truck bed 452 with a depressed center section 454 located between a pair of bench seats 456. The depressed center section 454 provides footspace for personnel sitting on the bench seats 456 to reduce the overall height, as well as reducing the need for rear steps to be added to allow the personnel to board the mine service vehicle 450. The mine service vehicle 450 has a rear closure member 458 that is configured to support one end of the bench seats 456 without obstructing access to the depressed center section 454.

FIG. 12 illustrates an alternative frame coupling assembly 500 which can be employed to couple together a forward module terminating plate 502 and a rear module terminating plate 504. The coupling assembly 500 employs a number of threaded posts 506 which are affixed to the forward module terminating plate 502. The rear module terminating plate 504 is provided with a matching number of holes 508, and preferably is reinforced by reinforcing plates 510. When the forward module terminating plate 502 and the rear module terminating plate 504 are aligned, the threaded posts 506 can be inserted through the holes 508. Tensioning sleeves 512 are placed over the threaded posts 506, and nuts 514 are threaded onto the threaded posts 506. To prevent backing off of the nuts 514 after tightening, the threaded posts 506 can be drilled to accept cotter pins (not shown) that engage the nuts 514 to prevent loosening.

While the novel features of the present invention have been described in terms of particular embodiments and preferred applications, it should be appreciated by one skilled in the art that substitution of materials and modification of details obviously can be made without departing from the spirit of the invention.

We claim:

1. A mine service vehicle comprising:
a unitized forward module having a forward frame section that has,
a pair of forward side members, each of which terminates in a front axle saddle and a forward member horizontal section,
a forward module terminating plate attached to said forward member horizontal sections,
said forward module terminating plate and said forward member horizontal sections providing a cab shield and undercarriage, and
a pair of gusset plates, each of which is attached to the one of said pair of forward side members and to said forward module terminating plate, said gusset plates forming part of said cab shield and undercarriage;
a unitized rear module having a rear frame section that has,
a pair of spaced apart rear side members, each of which has a rear member horizontal section and a rear member inclined section,
a rear module terminating plate attached to said rear member inclined sections and terminating the same,
a cross brace attached between said pair of spaced apart rear side members in close proximity to said rear member inclined sections;
means for affixing said forward module terminating plate to said rear module terminating plate having,
aligned bolt passages through each of said terminating plates,
bolt receiver plates, each having threaded bolt holes that are alignable with a subset of said bolt passages, said bolt receiver plates being attached to one of said terminating plates, and
bolts for passing through said bolt passages and threading into said threaded bolt holes and securing said terminating plates together when tightened in said threaded bolt holes;
a cab configured to house an operator of the mine service vehicle; and
means for attaching said cab with respect to said unitized front module and said unitized rear module.

2. The mine service vehicle of claim 1 further comprising:
undercarriage stringers which tie across open bottoms of said front axle saddles and which are configured such that an axle mounted in said front axle saddles resides above said undercarriage stringers.

3. The mine service vehicle of claim 2 further comprising:
bed flanges attached to each of said pair of rear side members; and
a truck bed which can be secured to said bed flanges.

4. The mine service vehicle of claim 3 further wherein said cab is of modular construction and further wherein said means for attaching said cab further comprises:

front cab mounting elements;
front hold-down tabs affixed with respect to said forward frame section;
means for coupling said cab front mounting elements to said front hold-down tabs;
cab back mounting elements;
rear hold-down tabs affixed with respect to said rear frame section; and
means for coupling said cab back mounting elements to said back hold-down tabs.

5. The mine service vehicle of claim 4 wherein said means for coupling said cab front mounting elements to said front hold-down tabs and said means for coupling said cab back mounting elements to said back hold-down tabs are resilient means.

6. The mine service vehicle of claim 5 wherein said cross brace is a K-brace.

7. The mine service vehicle of claim 1 further comprising:
bolt load distributing plates for placement over the one of said terminating plates to which said bolt receiver plates are not attached; and
tensioning sleeves through which said bolts pass.

8. The mine service vehicle of claim 7 further comprising:
front body panels; and
front fender panels,
each of said panels being integrated with said forward frame section to form part of said unitized forward module.

9. The mine service vehicle of claim 3 wherein the vehicle has a powerable rear axle and wherein the service vehicle further comprises a pair of arm assemblies, each of said arm assemblies further comprising:
an axle support bar terminating in a support bar mount that extends normal to said axle support bar, said support bar mount terminating at a pair of mount end surfaces and having a mount passage therethrough;
a pair of compliant mount bearings, each of said mount bearings having a mount bearing passage therethrough, said mount bearings each being configured to slidably engage said mount passage and having a mount bearing flange for seating on one of said mount end surfaces;
a pair of axle support brackets, each of said axle support brackets having an axle support bracket passage therethrough, said axle support brackets mounting to said rear frame section so as to provide a pair of spaced apart bracket faces;
a pair of compliant bracket bearings, each having a bracket bearing passage therethrough and being configured to slidably engage one of said axle support bracket passages and having a bracket bearing flange for seating on one of said spaced apart bracket faces so as to be opposed to one of said mount bearing flanges when said mount bearings are engaged with said mount passage and said support bar mount is interposed between said axle support brackets; and
a pivot bolt passing through said axle support brackets, said bracket bearing passages of said bracket bearings, said mount bearing passages of said mount bearings, and said mount passage of said axle support bar; and,
means for maintaining said pivot bolt engaged in said bracket bearing passages and said mount bearing passages,
wherein said axle support brackets are spaced apart by a separation S sufficient to accommodate said support bar mount with all associated bearing flanges therebetween with said flanges being under a compressive load.

10. The mine service vehicle of claim 9 wherein each of said arm assemblies further comprises:
a pair of retaining washers, positioned on either side of said axle support brackets and through which said pivot bolt passes,
further wherein said means for maintaining said pivot bolt engaged in said bearing passages is a nut.

11. The mine service vehicle of claim 10 further comprising;
a slip washer interposed between mating surfaces of each pair of said opposed mount bearing flanges and bracket bearing flanges.

* * * * *